United States Patent [19]

Randall

[11] 4,079,988

[45] Mar. 21, 1978

[54] ELEVATING TAILGATE

[75] Inventor: Francis R. Randall, Mount Gilead, Ohio

[73] Assignee: Peabody International Corporation, Galion, Ohio

[21] Appl. No.: 769,011

[22] Filed: Feb. 28, 1977

[51] Int. Cl.² .............................................. B62D 33/00
[52] U.S. Cl. .................................... 296/57 R; 49/340
[58] Field of Search ..................... 296/56, 57 R, 57 A, 296/62; 49/340; 214/77 R, 77 P

[56] References Cited

U.S. PATENT DOCUMENTS

| 2,850,187 | 9/1958 | Roberts | 296/57 R |
| 3,883,014 | 5/1975 | Glomski | 296/57 A |

Primary Examiner—Philip Goodman
Attorney, Agent, or Firm—Henry K. Leonard

[57] ABSTRACT

A power actuated elevating tailgate mechanism. The mechanism includes parallel link-type lift arms pivoted to the rear of a vehicle frame, a platform pivotally connected at its front edge to the rear of the arms and a power cylinder for moving the arms back and forth between lower, horizontal ground position of the platform and upper, horizontal unloading position adjacent to and at the level of the vehicle bed. A safety lock comprising cooperating hook and catch automatically is engaged when the platform reaches upper position. The mechanism also includes an auxiliary pivot bar mounted at the rear of the vehicle bed and a striker mounted at the front edge of the platform which can be moved into extended position in order to engage the pivot bar when desired so that, as the lift arms move to upper position, the platform is swung upwardly relative to the lift arms from horizontal to reach vertical, tailgate position relative to the vehicle bed when the lift arms reach their upper position.

10 Claims, 7 Drawing Figures

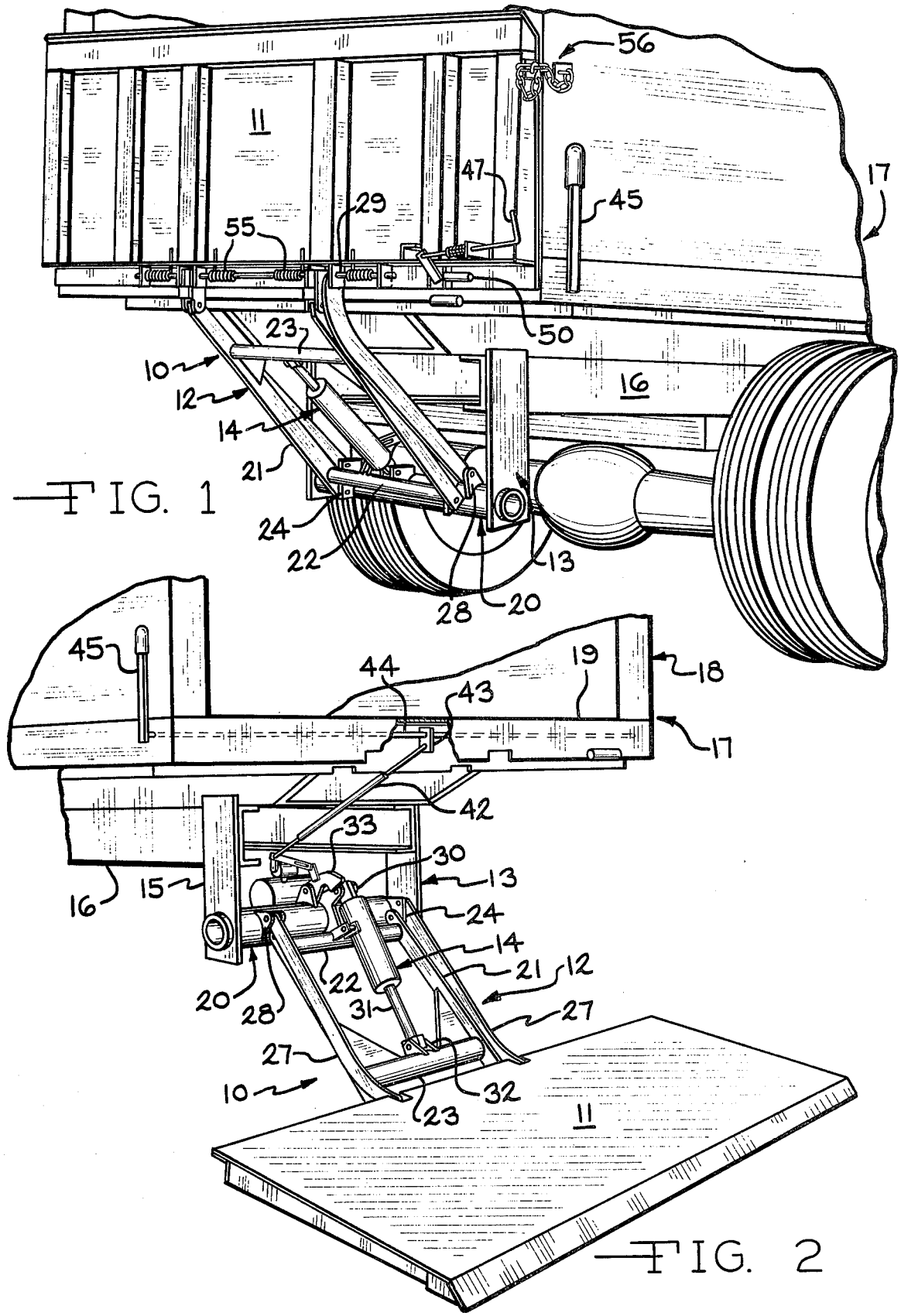

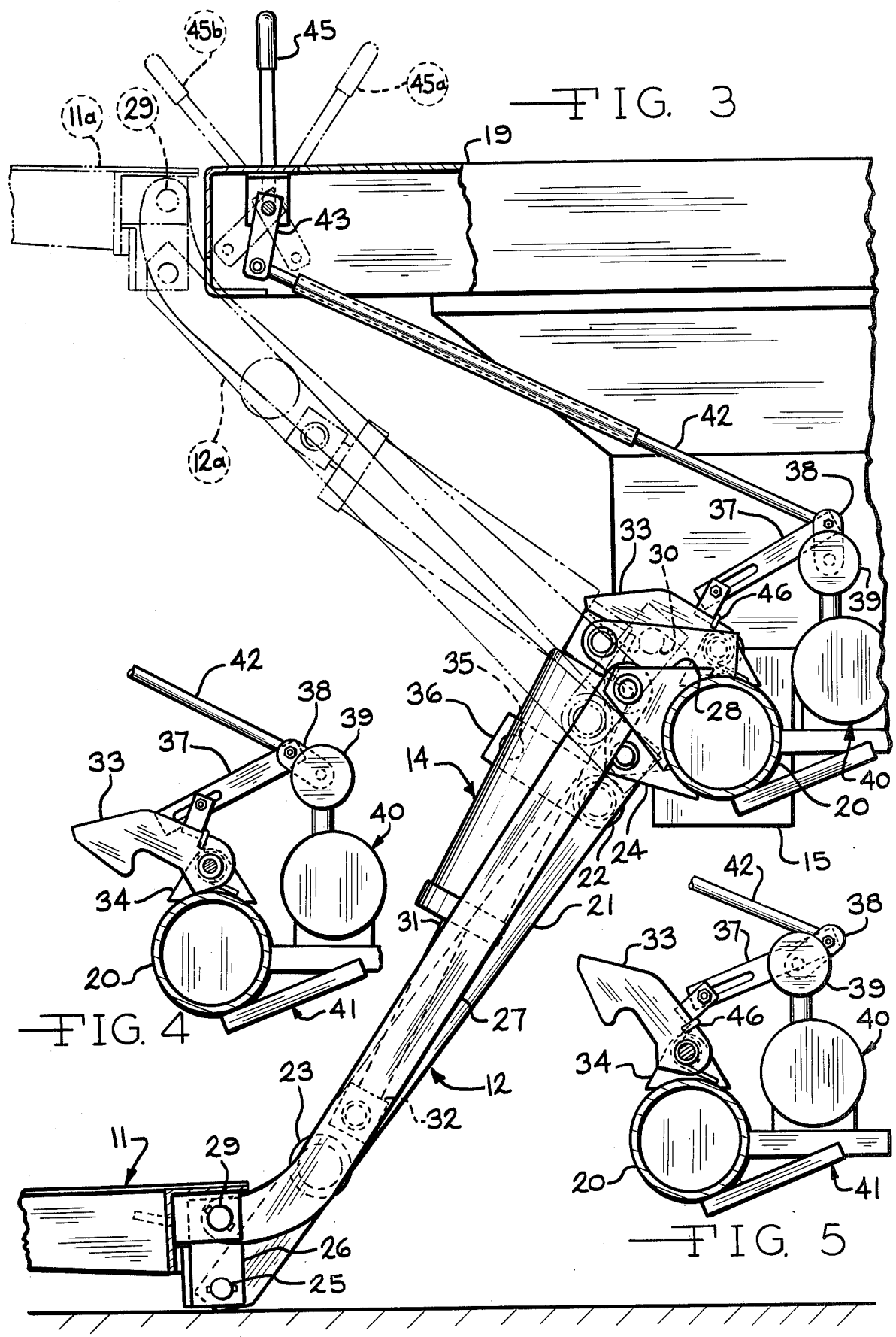

ELEVATING TAILGATE

BACKGROUND OF THE INVENTION

An elevating tailgate or lift platform for a motor vehicle such as a flat bed truck usually is carried by a frame suspended from the rear of the truck bed and comprises lift arms, the platform itself and power means such as a hydraulic cylinder by which the lift arms are swung from a lower or loading position of the platform, wherein it is substantially at ground level, to an upper or unloading position where the platform remains horizontal but is substantially at the level of the truck bed. In some of these devices the elevating platform is so pivotally mounted on the ends of the lift arms that it can be swung upwardly into a vertical position at the back of the truck bed and thus can function as a tailgate after it has been used for lifting heavy items from ground level up to the truck bed. It is to this latter type of device that the instant invention is directed.

Some prior art elevating platforms and/or tailgates can be swung from their upper, unloading position where they are horizontal to a vertical tailgate position by being manually moved from the one position to the other. However, in order that such a device may lift relatively heavy loads, the platform itself usually is quite massive and swinging the platform from its upper horizontal position at the level of the truck bed to a vertical, tailgate position manually is rather difficult as well as being somewhat dangerous. Even when safety chains or locks are provided, if the operator must first swing the platform vertically to tailgate position he then has to hold it in that position with one hand while he engages the safety lock or chain to prevent the tailgate from falling downwardly.

It is, therefore, the principal object of the instant invention to provide an elevating tailgate which not only is power actuated for elevating massive items from ground level to the truck bed level but also is power actuated to swing from its upper horizontal unloading position to a vertical tailgate position.

BRIEF DESCRIPTION OF THE DRAWINGS

FIG. 1 is a fragmentary view in perspective showing a truck equipped with an elevating tailgate embodying the invention, the elevating tailgate being shown in its upper, vertical, tailgate position;

FIG. 2 is a fragmentary view in perspective showing a tailgate embodying the invention in its lower, loading position with the platform substantially at ground level;

FIG. 3 is a fragmentary view, partly in an elevation and partly in section, showing the apparatus embodying the invention both in its lower, ground contacting position and, in phantom, in its upper unloading position at the level of a truck bed;

FIG. 4 is a fragmentary, detailed view illustrating how a safey hook is actuated by the same operating lever by which valving to the hydraulic power cylinder of the apparatus is actuated;

FIG. 5 is a view similar to FIG. 4 but illustrating the mechanism of FIG. 4 in a second position;

DESCRIPTION OF PREFERRED EMBODIMENT

Figure 6:
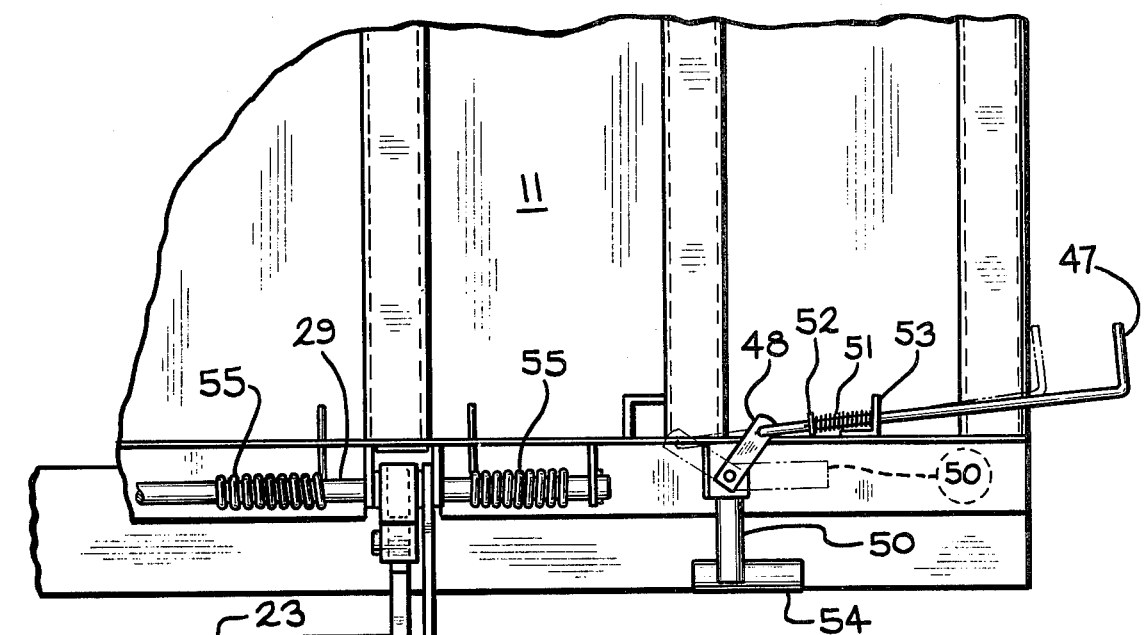
FIG. 6 is a fragmentary view, partly in rear elevation, illustrating how cooperating means are moved into operative position in order that an elevating tailgate embodying the invention can be moved by its hydraulic cylinder to its upper, tailgate position when desired.

An elevating tailgate mechanism embodying the invention is generally indicated by the reference number 10 and comprises a platform 11, parallel link-type lift arms 12, a mounting frame 13 and a power cylinder 14. The mounting frame 13 comprises two vertically extending struts 15 which are spaced laterally from each other and which, at their upper ends, are welded or otherwise rigidly connected to the rear ends of chassis members of a truck generally indicated by the reference number 17. The truck 17 has a body fragmentarily shown and indicated by the reference number 18 which has a flat bed 19 (FIGS. 2 and 3). The mounting frame 13 also includes a heavy horizontal cross members 20 which is carried by the struts 15 and which, in turn, supports the operative elements of the mechanism.

The lift arms 12 comprise an inner pair of straight power arms 21 which are connected near their front ends by a cross tube 22 and their rear ends by a second cross tube 23. The arms 21 are pivoted at their front ends on brackets 24 which are welded to the cross member 20 and, at their rear ends, are connected by pivot pins 25 to platform mounting links 26. A second pair of arms 27 are pivoted at their forward ends by a pair of ears 28 and, at their lower ends, are pivotally connected to the mounting links 26 by a pivot pin 29 which also functions to pivotally connect the platform 11 to the arms 27. The base of the power cylinder 14 is mounted by a pair of brackets 30 which also are welded to the cross member 20 and the end of its rod 31 is pivotally connected by ears 32 to the rear cross tube 23.

By the connections just described, when the cylinder 14 is energized to retract its rod 31, the lift arms 12 are swung upwardly from the lower position, where the platform 11 is substantially at ground level for loading items, to its unloading position with the top of the platform 11 lying substantially in the same plane as the bed 19 of the truck 17. In FIG. 3 the lower, loading position of the lift arms 12 and platform 11 is shown in solid lines and the upper, unloading position thereof is shown in broken lines indicated, respectively, by the reference numbers 12a and 11a.

Because of the fact that it is almost impossible to seal a hydraulic system such as that which supplies fluid to the power cylinder 14 against leakage, when a heavy load has been elevated to the level of the truck bed 19, its weight tends to cause the platform 11 and the lift arms 12 to move downwardly from their upper, loading position toward the ground. In order to prevent this action from taking place, an elevating tailgate according to the invention has a safety hook 33 which is pivoted for vertical movement on a pair of ears 34 that are welded to the heavy cross member 20. Hook 33 is one of a pair of cooperating lock elements, the other one being a latch pin 35 mounted in brackets 36 which are welded to the cross tube 22. The hook 33 is connected to a slotted link 37 and, by the link 37, to a valve actuating arm 38. The arm 38 controls a valve generally indicated by the reference number 39 mounted on a self-contained power unit 40. The power unit 40 is supported by a plate and brace 41 just forward of and mounted on the cross member 20. The power unit 40 is self-contained and comprises a hydraulic tank, an electrically driven pump and proper fittings, both hydraulic and electrical, to connect the motor for driving the pump to a source of electric power and the pump, itself, to the power cylinder 14. None of these connections is illustrated because they are conventional. The valve 39 simply reverses the hydraulic connections to the cylinder 14 so that it alternately can be controlled to extend and retract its rod 31. The valve actuating arm 38 is connected by a rod 42 to a lever 43 which, in turn, is pinned on a cross rod 44 on the opposite, outer ends of which are fixedly mounted hand levers 45.

In FIG. 3 the hand lever 45, its rod 42, the valve actuating arm 38, the slotted link 37 and the hook 33 are all shown in neutral position. When it is desired to raise the platform 11 from its lower position (solid lines FIG. 3) to its upper unloading position (broken lines FIG. 3), the hand lever 45 is swung toward the front of the truck (clockwise FIG. 3) to the position shown in broken lines and indicated by the reference number 45a. This pulls the rod 42 and swings the valve actuating arm 38 in the opposite direction as shown in FIG. 4. By reason of the "lost motion" slot in the link 37, when the link 37 is moved, the hook 33 can swing downwardly on its pivot pin in the ear 34 until its base engages the surface of the cross member 20 as shown in FIG. 4. Simultaneously, of course, by reason of the movement of the valve actuating arm 38 to the position shown in FIG. 4, hydraulic fluid is fed into the retract end of the hydraulic cylinder 14 causing the cylinder to retract its cylinder rod 31 and to swing the lift arms 12 upwardly carrying the platform 11 up to the position indicated in broken lines by the reference number 11a.

As the lift arms 12 swing upwardly, the latching pin 35 also is swung upwardly and engages the hook 33, deflecting the hook 33 upwardly (clockwise in FIG. 3) until the pin 35 has fully entered the notch in the hook 33 where it is caught and thus locks the lift arms 12 and the platform 11 in their upper position. In order to insure the engagement of the hook 33 with the latch pin 35, a torsion spring 46 is engaged with the hook 33 and bears against the surface of the cross member 20.

Conversely, when it is desired to lower the platform 11 from its upper position to its ground position, the hand lever 45 is swung toward the rear of the truck (counter clockwise FIG. 3) to the position indicated by the reference number 45b in FIG. 3. This moves the rod 42 swinging the valve actuating arm 38 to the position shown in FIG. 5 which moves the slotted link 37 as illustrated so that it pulls the hook 33 upwardly (clockwise) in FIG. 5 disengaging the hook 33 from the latch pin 35. Simultaneously therewith, movement of the valve actuating arm 38 to the position of FIG. 5 reverses the flow of hydraulic fluid to the cylinder 14 causing it to extend its rod 31 to swing the lift arms 12 and the platform 11 from their upper position to their ground position. Of course, returning the hand lever 45 to neutral position again allows the hook 33 to be swung by its spring 46 to the position illustrated in FIG. 3.

Figure 7:
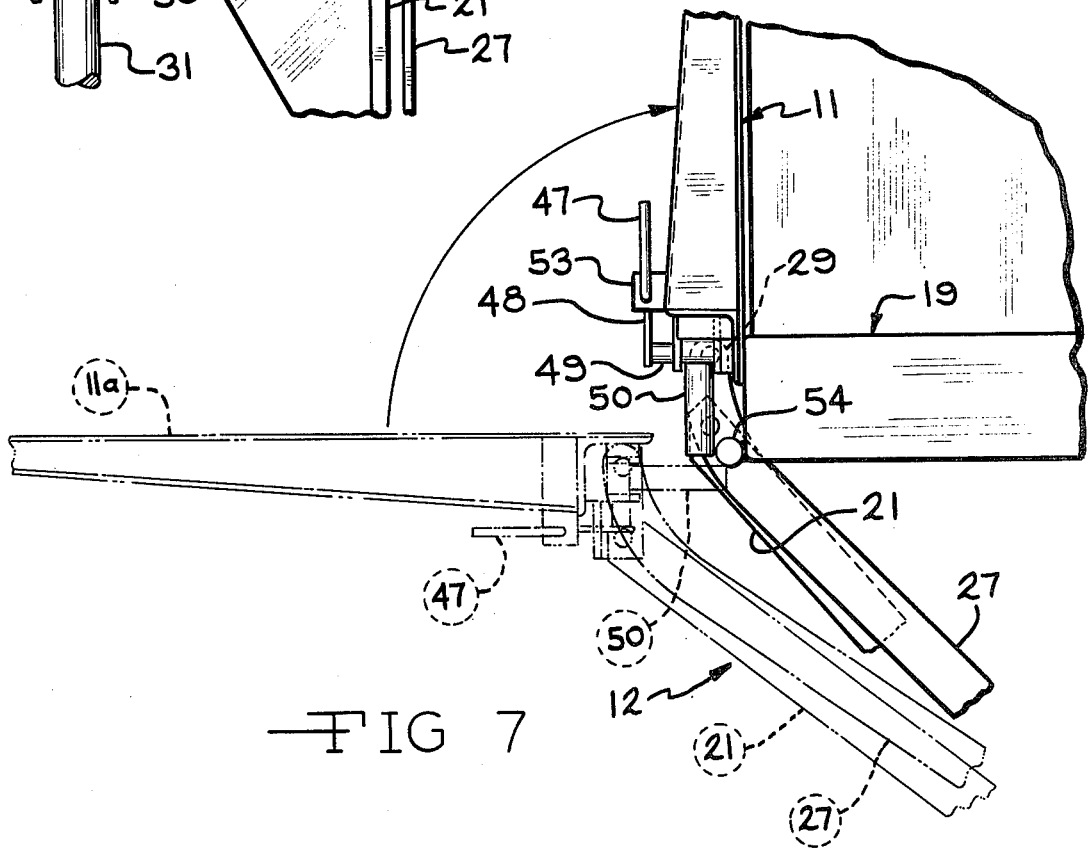
FIG. 7 is a fragmentary view in an elevation illustrating how the cooperating means functions to swing the floating platform to upper tailgate position when desired.

FIGS. 6 and 7 illustrate the operation of cooperating means which selectively may be moved into position of interengagement in order that the power cylinder 14 may be utilized for swinging the platform 11 from its substantially horizontal position to a vertical position at the rear of the truck bed 19 i.e., to a tailgate position.

FIG. 6 is a fragmentary rear view in elevation showing the tailgate 11 in its vertical tailgate position with portions of the lift arms 12. FIG. 7 is a fragmentary view in side elevation showing the platform 11 in its vertical tailgate position and illustrating how it is swung from a horizontal position, shown in broken lines indicated by the reference number 11a, to the tailgate position shown in the solid lines.

The cooperating means shown in detail in FIGS. 6 and 7 also are shown in FIG. 1 and comprise, among other parts, a handle 47 connected to a bell crank 48 which is fixed on a pin 49 to which there also is welded, or otherwise permanently and rigidly secured, a striker 50. An extension spring 51 is positioned between a collar 52 on the main bar of the handle 47 and a guide bracket 53 which is fixed to the under side of the platform 11 and through which the handle 47 extends. The spring 51 normally holds the handle 47 in its inactive position (FIG. 1 and broken lines in FIG. 6) so that the striker 50 remains beneath the edge of the platform 11 during operation of the mechanism to reciprocate the platform 11 between its lower position for loading items and its upper unloading position as shown in broken lines in FIG. 3.

When it is desired to move the platform 11 to its vertical, tailgate position, the handle 47 is pulled outwardly (solid lines FIG. 6) rotating the pin 49 and swinging the striker 50 from the broken line position in FIG. 6 to the solid line position therein. As can be seen in FIG. 7, this action is instigated by the operator prior to the arrival of the platform 11 at its uppermost unloading position so that when the striker 50 is swung outwardly and forwardly relative to the platform 11, it moves into a position of engagement with a pivot bar 54 welded or otherwise fixed to the lower rear of the frame of the truck bed 19. This particular position is shown in broken lines in FIG. 7.

When the handle 47 is moved to the position shown in solid lines in FIG. 6, the striker 50 is swung forwardly relative to the front edge of the platform 11 so that as the lift arms 12 swing upwardly, the end of the striker 50 engages the pivot bar 54 and, as the lift arms 12 continue to rise, the platform 11 pivots relative to the platform support links 26 on the elongated pivot pin 29. Torsion springs 55 which are positioned around the pin 29 are biased to hold the platform 11 in its vertical position. Retaining chains 56 (FIG. 1) are then hooked between the sidewalls of the truck body 18 and the platform 11. After the platform 11 has reached its tailgate position, the operator releases the handle 47 which is returned by the spring 51 to normal position, swinging the striker back beneath the edge of the platform 11.

When it is desired again to employ the mechanism for elevating objects to the truck, the chains 56 are disengaged. The operator then moves the hand lever 45 to the position indicated by the reference number 45b in FIG. 3. Movement of the lift arms 12 rearwardly results in gravity tending immediately to swing the platform 11 down which, if it were allowed to fall freely, would pose a danger to anyone standing at the rear of the truck. However, the springs 55 are so selected as to exert a sufficient bias against the rearward angular movement of the platform 11 that it either can only slowly swing down or will be held up and can be pulled down by the operator with little force being required.

Having described my invention, I claim:

1. An elevating tailgate mechanism having parallel link-type lift arms that pivotally are connected at their front ends to a vehicle frame, a platform extending rearwardly from and pivotally carried by the free ends of said arms and power means for swinging said arms back and forth between a loading portion with said platform substantially at ground level and an upper portion with said platform adjacent to and at the level of the bed of the vehicle and comprising, in combination, (a) an operator,
(b) a power control actuated by said operator for energizing said power means to move said arms alternately back and forth between such positions,
(c) cooperating lock elements mounted on said frame and said mechanism which are engaged when said arms reach their upper position and disengaged when said power control is acutated for moving said arms away from their upper position,
(d) cooperating means mounted on the rear edge of said vehicle frame and the front of said platform that are movable into position for engagement as said platform moves toward upper position for pivoting said platform vertically upwardly relative to said arms into tailgate position relative to said vehicle frame,
(e) a control for moving said cooperating means into position for engagement, and
(f) means normally holding said cooperating means out of position for engagement during movement of said arms and said platform between lower and upper positions.

2. An elevating tailgate mechanism according to claim 1 in which the cooperating lock elements include a lost motion connection comprising a slotted link.

3. An elevating tailgate mechanism according to claim 1 in which the cooperating means consists of a pivot bar and a striker, one mounted on said vehicle frame and one mounted on said platform, one of said means being selectively movable into position for engagement with the other as said platform moves toward upper position.

4. an elevating tailgate mechanism accordng to claim 1 in which the cooperating means consists of
(a) a cooperating auxiliary pivot bar and striker mounted one on said frame and one on said platform which normally are not engaged when said arms move said platform toward upper position,
(b) a control for moving said striker into position for engaging said pivot bar prior to the arrival of said platform at upper postion whereby continued movement of said arms toward upper position after engagement of said pivot bar and said striker pivots said platform vertically upwardly on said arms into vertical tailgate position at the rear of said vehicle bed.

5. An elevating tailgate mechanism according to claim 1 and means biasing said platform toward its tailgate position relative to the lift arms.

6. In a power actuated elevating tailgate mechanism having parallel link type lift arms pivoted to a vehicle frame at their front ends, a load platform pivotally mounted along its front edge to the rear ends of the lift arms and a power means connected between said frame and said arms for moving said arms back and forth between a lower position with said platform substantially at ground level and an upper position with said platform at the level of the bed of the vehicle, the improvement comprising in combination, (a) a striker mounted at the front edge of said platform for movement between a normal retracted position and an extended position in which said striker extends forwardly from the front edge of said platform,
(b) a pivot bar mounted on the rear edge of said vehicle frame in position to be engaged by said striker as said platform moves toward upper position, and
(c) a control for moving said striker into extended position,
whereby said platform is swung upwardly relative to said arms into vertical tailgate position as said arms reach their upper position.

7. A tailgate mechanism according to claim 6 and means resiliently holding said striker in retracted position.

8. A tailgate mechansim according to claim 6 and means biasing the platform toward tailgate position relative to the lift arms.

9. A tailgate mechanism according to claim 8 in which the biasing means in a torsion spring mounted on the pivot element for the platform.

10. A tailgate mechanism according to claim 6 in which the lift arms consist of two, connected, parallel, spaced power arms and a parallel link-arm for each of said power arms, and the platform is mounted by a cross pivot pin at the rear ends of the link-arms.

* * * * *